Patented Feb. 17, 1948

2,436,142

UNITED STATES PATENT OFFICE 2,436,142

POLYFLUOROCYCLOBUTENES

Jesse Harmon, Wilmington, Del., assignor to E. I. du Pont de Nemours & Company, Wilmington, Del., a corporation of Delaware No Drawing. Application September 3, 1943, Serial No. 501,149

4 Claims. (Cl. 260—648)

This invention relates to a new class of fluorine-containing organic compounds and their polymers, and more particularly to new cyclic fluorine-containing organic compounds.

In recent years considerable attention has been given to fluorine compounds and to their preparation. However, to date the number of known unsaturated fluorine-containing organic compounds is relatively small, and their methods of preparation have been laborious and expensive. The methods of preparation of fluorine compounds usually consist of replacing part or all of the bromine or chlorine atoms with fluorine by means of expensive and hazardous inorganic fluorinating agents such as metallic fluorides, silver fluoride, antimony fluorides, mercuric fluoride, or hydrogen fluoride. In the present invention a new class of unsaturated organic fluorine compounds and their polymers are prepared readily without using dangerous or expensive inorganic fluorinating reagents.

This invention has as an object new organic fluorine-containing compounds. A further object is a new class of unsaturated cyclo organic fluorine-containing compounds. A still further object is a new class of polymeric cyclo organic fluorine-containing compounds. Further objects reside in methods for preparing these compounds. Additional objects will become apparent from an examination of the following description and claims.

These and other objects and advantages are accomplished by the herein described invention which broadly comprises fluorocyclobutenes; and in a more restricted sense comprises polyfluorocyclobutenes. Said fluorocyclobutenes include monomeric fluorocyclobutenes and fluorocyclobutene polymers. Members of this new class of fluorocyclobutenes are prepared by dehalogenating the corresponding halogen-containing monomeric fluorocyclobutane. Other methods of preparing said members include dehydrohalogenation, dehydration, deacetylation, dehydrogenation, and pyrolysis of monomeric fluorocyclobutanes. Polymeric members of this new class of compounds can be prepared by the polymerization of monomeric fluorocyclobutenes in the presence of polymerizable ethylenic compounds.

The prefix "polyfluoro" as used herein refers to the number of fluorine atoms and not to polymeric materials.

The fluorocyclobutanes employed in the present invention are monomeric compounds having the general formula

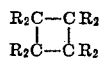

wherein the R substituents are monovalent radicals selected from the group consisting of hydrogen, halogens and monovalent organic radicals, at least one of the R substituents being a fluorine atom. Said fluorocyclobutanes are obtained by heating a fluoroethylene alone, as disclosed in U. S. Patent No. 2,404,374, issued July 23, 1946, to Jesse Harmon, or with an unsaturated organic compound in the absence of a polymerization catalyst, as disclosed in copending U. S. application Serial No. 484,239, filed April 23, 1943, by Paul L. Barrick.

One preferred sub-class of fluorocyclobutanes for use in this invention is completely halogenated polyfluorocyclobutanes having the general formula

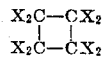

in which X is halogen and in which at least 4 of the X substituents are fluorine and at least 2 are halogen other than fluorine. As disclosed in U. S. Patent No. 2,404,374, issued July 23, 1946, said polyfluorocyclobutanes are conveniently prepared by heating at a temperature within the range of from 125° C. to 500° C. under superatmospheric pressure, a completely halogenated polyfluoroethylene of the formula $CX_2=CX_2$ in which X is halogen, and in which at least 2 of the X substituents are fluorine and at least 1 is halogen other than fluorine.

Another preferred sub-class of fluorocyclobutanes is monomeric fluorocyclobutanes containing at least one hydrogen atom, preferably polyfluorocyclobutanes of the general formula

in which R is a monovalent radical selected from the group consisting of hydrogen and monovalent organic radicals, and the X substituents are monovalent radicals selected from the group consisting of hydrogen, halogens and monovalent organic radicals. As disclosed in copending U. S. application Serial No. 484,239, filed April 23, 1943, said polyfluorocyclobutanes are conveniently prepared by heating tetrafluoroethylene with another unsaturated organic compound at a temperature between 50° C. and that at which decomposition of the reactants and products obtained occurs.

The fluoroethylene employed in the preparation of the fluorocyclobutanes used in this invention should be stable against polymerization on standing under pressure at 25° C. The preparation of stabilized tetrafluoroethylene, which is not a part of this invention, can be accomplished by different means. One method consists in reducing the normally contained oxygen content (about 0.1% to 0.2% by volume) to not more than 40 parts of oxygen in a million parts of tetrafluoroethylene. Another method for stabilizing tetrafluoroethylene against polymerization consists in adding polymerization inhibiting compounds. Compounds of this kind are those containing thiol sulfur, examples of which are n-butyl mercaptan, hydrogen sulfide, etc., and compounds containing amine nitrogen, for example, ammonia, di- and tri-butyl amine and other amines. These methods are described more fully in U. S. Patent No. 2,407,405, issued September 10, 1946, to Melvin A. Dietrich and Robert M. Joyce, Jr., in U. S. Patent No. 2,407,419, issued September 10, 1946, to William E. Hanford, and in U. S. Patent No. 2,407,396, issued September 10, 1946, to Merlin M. Brubaker. Many fluoroethylene compounds other than tetrafluoroethylene, for example trifluorochloroethylene, trifluoroethylene, 1,1-difluoro-2,2-dichloroethylene, 1,2-difluoro-1,2-dichloroethylene, 1,1-difluoro-2-chloroethylene, and 1,1-difluoroethylene, are comparatively stable against polymerization on standing under pressure at normal temperatures, and in the case of these compounds further treatment to stabilize against polymerization is not necessary.

In the preparation of the fluorocyclobutanes employed in this invention it is desirable to carry out the reaction under substantially non-polymerizing conditions. In general, it is preferable to exclude polymerization catalysts and to sometimes use a small amount of polymerization inhibitor such as hydroquinone, "Terpene B" hydrocarbon, or tributyl amine.

According to the present invention, a polyfluorocyclobutane derivative such as dichlorohexafluorocyclobutane, formed by cyclo-dimerizing chlorotrifluoroethylene, is converted into hexafluorocyclobutene by dehalogenation, as by heating with zinc suspended in ethanol at the reflux temperature of said alcohol.

The equipment used in the preparation of the products of this invention may be constructed of glass or of various metals such as iron, steel, aluminum, monel metal, or copper.

The following examples, in which proportions are given in parts by weight unless otherwise specified, are given for illustrative purposes and are not intended to place any restrictions or limitations on the herein described invention:

Example I

The air in a stainless steel autoclave was displaced with nitrogen, the reactor was evacuated and then charged with 195 parts of chlorotrifluoroethylene. The reactor was agitated and heated to 200–201° C. for 11 hours. After cooling and releasing the pressure, 124 parts of a liquid product boiling at 58–59° C. and identified as dichlorohexafluorocyclobutane was obtained. Ninety-four parts of the dichlorohexafluorocyclobutane dissolved in 40 parts of absolute ethanol was added slowly with stirring to a mixture of 75 parts of zinc dust and 40 parts of absolute ethanol. The reaction mixture was warmed gently on a steam bath for 4 hours under a water-cooled reflux condenser, the top of which was connected through a calcium chloride drying tower to a dry ice-acetone-cooled trap. The low boiling product contained in the dry ice-acetone trap was fractionated in a low temperature still to obtain 49 parts of hexafluorocyclobutene boiling at 5 to 6° C. and 18.5 parts of unchanged dichlorohexafluorocyclobutane. This corresponds to a 94% yield of hexafluorocyclobutene based on 75.5 parts of dichlorohexafluorocyclobutane.

The hexafluorocyclobutene slowly absorbed bromine from a carbon tetrachloride solution.

Example II

A stainless-steel, high-pressure reactor was flushed with nitrogen, and 25 parts of distilled water and 0.1 part of benzoyl peroxide were added. After the reactor was evacuated, cooled, and charged with 10 parts of hexafluorocyclobutene and 28 parts of ethylene, the polymerization mixture was heated at about 80° C. with agitation for 8 hours. The pressure in the system during the polymerization was maintained at about 800 to 990 atmospheres by the intermittent injection of water. When the pressure appeared to remain practically constant, indicating no further polymerization was taking place, the reactor was cooled to room temperature, the pressure was released and the polymer was dried under reduced pressure. There was obtained 24.5 parts of a rubbery ethylene-hexafluorocyclobutene polymer containing 20.64% fluorine.

Polymerization of hexafluorocyclobutene with tetrafluoroethylene in a similar manner yielded a hexafluorocyclobutene/tetrafluoroethylene copolymer which softened at about 310° C.

Example III

Two hundred parts of solid potassium hydroxide was placed in a distillation flask and heated in a metal bath to 190–200° C. One hundred parts of 1-vinyl-1-chloro-2,2,3,3-tetrafluorocyclobutane was added slowly to the hot alkali and the reaction products were distilled from the reaction mixture as rapidly as formed. Redistillation of the dried distillate yielded 56 parts of 1-vinyl-3,3,4,4-tetrafluorocyclobutene boiling at 98–100° C. 1-vinyl-1-chloro-2,2,3,3-tetrafluorocyclobutane can also be dehydrochlorinated to 1-vinyl-3,3,4,4-tetrafluorocyclobutene by treatment with alcoholic potassium hydroxide at room temperature.

As hereinbefore stated, the novel products of this invention are fluorocyclobutenes, i. e., compounds containing at least one fluorine-containing cyclobutene ring. Said fluorocyclobutenes include monomeric fluorocyclobutenes and polymers prepared therefrom.

The monomeric fluorocyclobutenes of this invention may be represented by the general formula

wherein the R substituents are monovalent radicals selected from the group consisting of hydrogen, halogens and monovalent organic radicals, and at least one of the R substituents is fluorine. Examples of monovalent organic radicals contemplated include alkyl, alkenyl, alkynyl, cycloalkyl, aryl, aralkyl, alkoxy, ester, cyano, carboxyl, carbalkoxy, amido, acyl, formyl and methylol radicals.

While appreciable effects are obtained when the fluorocyclobutene compounds of this invention contain but one fluorine atom in the four-carbon atom ring, it is to be understood that substantially increased effects are had when said compounds are polyfluorocyclobutenes, i. e., contain at least 2 fluorine atoms in the cyclobutene ring. On account of their superior properties, the monomeric polyfluorocyclobutene compounds which are preferred are those having the general formula

wherein R is a monovalent radical selected from the group consisting of hydrogen, halogens and monovalent organic radicals, and the X substituents are selected from the group consisting of hydrogen and halogens. Special significance is attached to the completely halogenated monomeric cyclobutenes, particularly hexafluorocyclobutene,

As hereinbefore stated, the fluorocyclobutanes employed in the present invention are monomeric compounds having the general formula

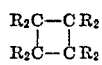

wherein the R substituents are monovalent radicals selected from the group consisting of hydrogen, halogens and monovalent organic radicals, and at least one of the R substituents is a fluorine atom. More specifically said monomeric fluorocyclobutanes are monomeric compounds having the general formula

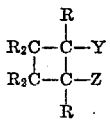

wherein the R substituents are monovalent radicals selected from the group consisting of hydrogen, halogens and monovalent organic radicals, at least one of the R substituents being a fluorine atom, Y is a monovalent radical selected from the group consisting of hydrogen and halogens, Z is a monovalent radical selected from the group consisting of hydrogen, halogens, the hydroxyl group and acyloxy groups, and YZ represents molecular hydrogen, a molecular halogen, a hydrogen halide, water or an aliphatic organic acid. Examples of halogens represented by Y and Z are fluorine, chlorine, bromine and iodine; while examples of acyloxy groups represented by Z are formyloxy, acetyloxy, propionyloxy and butyryloxy radicals; and examples of acids represented by YZ include formic, acetic, propionic and butyric acids. The preferred acyloxy groups represented by Z and the preferred aliphatic acids represented by YZ contain not more than 4 carbon atoms.

One general method of preparing the monomeric fluorocyclobutenes of this invention comprises removing the substituents YZ from a monomeric fluorocyclobutane having the hereinbefore defined general formula

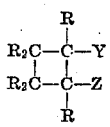

Examples of said general method for preparing monomeric fluorocyclobutenes from monomeric fluorocyclobutanes are dehalogenation and dehydrohalogenation reactions, as illustrated in the examples. Other examples include dehydration, deacylation and dehydrogenation reactions.

It will be understood that the operating conditions for preparing monomeric fluorocyclobutenes from monomeric fluorocyclobutanes may vary widely depending largely upon the nature of the particular fluorocyclobutane which is being reacted. For instance, monomeric fluorocyclobutanes containing at least 3 halogen atoms in the four-carbon atom ring, i. e., compounds having the general formula

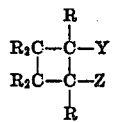

as hereinbefore defined, and more specifically having the general formula

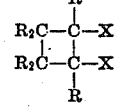

wherein the R substituents are monovalent radicals selected from the group consisting of hydrogen, halogens and monovalent organic radicals, at least one of the R substituents being a fluorine atom, and X is a halogen atom, are converted readily to corresponding monomeric fluorocyclobutenes by dehalogenation, whereby the X substituents are removed to provide a monomeric fluorocyclobutene having the general formula

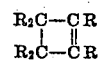

Dehalogenation is effected most readily when the aforesaid X substituents are chlorine atoms, i. e., the monomeric fluorocyclobutane contains at least two chlorine atoms in the four-carbon atom ring. Said dehalogenation is accomplished in accordance with this invention by heating the monomeric fluorocyclobutane with zinc, or a zinc-copper couple, in admixture with a lower aliphatic alcohol, such as methanol, ethanol, the propanols and the butanols. The dehalogenation is generally effected within the temperature range of from 50° C. to 150° C., and preferably at the reflux temperature of the alcohol used in the dehalogenation reaction. However, the dehalogenation reaction may be carried out in an open or closed system or by means of a vapor phase reaction at subatmospheric, atmospheric, or superatmospheric pressure.

Monomeric fluorocyclobutanes containing at least one hydrogen atom and at least two halogen atoms in the four-carbon atom ring, i. e., compounds having the general formula

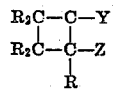

as hereinbefore defined, in which Y is a hydrogen atom and X is a halogen atom, are converted readily to the corresponding monomeric fluorocyclobutene by dehydrohalogenation, whereby HX is removed to provide a monomeric fluorocyclobutene having the general formula

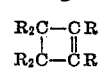

Dehydrohalogenation is effected most readily when the aforesaid X substituent is a chlorine atom, i. e., the monomeric fluorocyclobutane contains at least one chlorine atom and at least one hydrogen atom in the four-carbon atom ring. Said dehydrohalogenation may be accomplished in accordance with this invention by heating the monomeric fluorocyclobutane with an alkali, as described in Example III.

Monomeric fluorocyclobutanes containing at least one hydrogen atom and at least one hydroxyl group in the four-carbon atom ring, i. e., compounds having the general formula

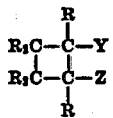

as hereinbefore defined in which Y represents a hydrogen atom and Z represents a hydroxyl group, are conveniently converted to the corresponding fluorocyclobutene by dehydration, whereby $H_2O$ is removed to provide a monomeric fluorocyclobutene having the general formula

Thus, 1-hydroxy-2,2,3,3-tetrafluorocyclobutane can be converted into tetrafluorocyclobutene by heating with concentrated sulfuric acid.

Monomeric fluorocyclobutanes containing at least one hydrogen atom and at least one acyloxy group in the four-carbon atom ring, i. e., compounds having the general formula

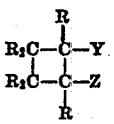

as hereinbefore defined in which Y represents a hydrogen atom and Z represents an acyloxy group, are conveniently converted to the corresponding fluorocyclobutene by deacylation, whereby the acid represented by YZ is removed to provide a monomeric fluorocyclobutene having the general formula

Deacylation is effected most readily when the acyloxy group represented by Z is an acetyloxy group. Thus 1-acetoxy-2,2,3,3-tetrafluorocyclobutane can be deacetylated to tetrafluorocyclobutene by pyrolyzing at high temperature.

Monomeric fluorocyclobutanes containing at least two hydrogen atoms in the four-carbon atom ring, i. e., compounds having the general formula

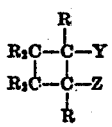

as hereinbefore defined in which Y and Z represent hydrogen atoms, are conveniently converted to the corresponding fluorocyclobutene by dehydrogenation, whereby hydrogen is removed to provide a monomeric fluorocyclobutene having the general formula

Thus 1,1,2,2-tetrafluorocyclobutane can be dehydrogenated to tetrafluorocyclobutene by heating with a dehydrogenation catalyst.

In certain instances it may be desirable to chlorinate or brominate a given fluorocyclobutane and then dehydrohalogenate in order to obtain the desired fluorocyclobutene. Dehalogenation and dehydrohalogenation reactions appear to proceed more smoothly than do dehydration, deacylation or dehydrogenation reactions, and hence are preferred for preparing monomeric fluorocyclobutenes from monomeric fluorocyclobutanes.

Another method of preparing a monomeric fluorocyclobutene comprises heating an unsaturated organic compound containing acetylenic unsaturation with a fluoroethylene which is stable against polymerization on standing under pressure at 25° C. Said method is described in detail in copending application Serial No. 484,239, filed April 23, 1943, by Paul L. Barrick.

The above processes may be operated continuously or intermittently. The reactions and the separation or isolation of the products may be carried out simultaneously or in separate steps. In general, the reactions may be carried out in a closed or open system at elevated temperatures, or the reactions may be effected in the vapor phase and, if desired, by passing the vapors through a hot reaction tube under subatmospheric, atmospheric, or superatmospheric pressure.

It is to be understood that this invention includes not only monomeric fluorocyclobutenes but also fluorocyclobutene polymers.

The fluorocyclobutene polymers of this invention are preferably prepared by polymerizing a mixture of a monomeric fluorocyclobutene and another polymerizable compound. By the term "polymerizable compound" as used herein and in the appended claims is meant an unsaturated organic compound which can be converted to high molecular weight compounds, i. e., products having a degree of polymerization greater than a dimer or trimer. Examples of said unsaturated compounds include vinyl and vinylidene compounds; vinyl esters, vinyl acetate, vinyl chloride, vinyl fluoride; acrylic and methacrylic acids and their derivatives such as esters, methyl ester, anhydride, amide, nitrile; olefinic hydrocarbons, ethylene, styrene, propylene, isobutylene; dienes, butadiene, chloroprene, fluoroprene, isoprene; vinylidene halides, vinylidene chloride; and the like.

The aforementioned polymerization reactions may be effected in bulk, in solution, or in emulsion by application of heat, light, oxygen, peroxides, or other oxygen-liberating substances as catalysts, and under subatmospheric, atmospheric, or superatmospheric pressure. The oxygen-liberating catalysts which are applicable include diacyl peroxides, benzoyl peroxide, lauroyl peroxide, diethyl peroxide, tertiarybutyl hydroperoxide, hydrogen peroxide, persulfates, ammonium persulfate, sodium persulfate, potassium persulfate, and the like. Other catalysts may be used such as amine oxides and hydrazine salts.

The fluorocyclobutene polymers of this invention contain at least one fluorine atom per four-carbon atom ring in the polymeric fluorocyclobutene. Markedly superior polymeric substances are afforded when said polymers are polymeric polyfluorocyclobutenes, particularly those had by polymerizing a polyfluorocyclobutene having the general formula

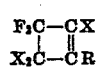

wherein R is a monovalent radical selected from the group consisting of hydrogen, halogens and monovalent organic radicals, and the X substituents are selected from the group consisting of hydrogen and halogens. Hexafluorocyclobutene polymers are preferred on account of the ease of their preparation and their superior properties.

The fluorocyclobutenes of this invention possess advantages not previously combined in an organic compound. Another advantage of the present invention is that it affords a convenient method for preparing new unsaturated polymerizable fluorine-containing organic compounds. The products of this invention are useful for various commercial purposes. Since many of the monomeric and polymeric materials of this invention are extremely stable, they are generally applicable for a wide variety of uses. Many of the products investigated have been found to be desirable in that they are substantially non-flammable and non-corrosive.

As many apparently widely different embodiments of this invention may be made without departing from the spirit and scope thereof, it is to be understood that I do not limit myself to the specific embodiments thereof except as defined in the appended claims.

Having described the present invention, the following is claimed as new and useful:

1. A monomeric polyfluorocyclobutene.
2. A monomeric compound, hexafluorocyclobutene.
3. The process for obtaining hexafluorocyclobutene which comprises heating dichlorohexafluorocyclobutane with zinc suspended in ethanol at the reflux temperature of said alcohol.
4. The process for obtaining a monomeric polyfluorocyclobutene which comprises dechlorinating a monomeric polychloropo'yfluorocyclobutane.

JESSE HARMON.

REFERENCES CITED

The following references are of record in the file of this patent:

UNITED STATES PATENTS

| Number | Name | Date |
|---|---|---|
| 2,146,720 | Christiansen | Feb. 14, 1939 |
| 2,301,356 | Arnold et al. | Nov. 10, 1942 |

OTHER REFERENCES

"Chemical Abstracts," vol. 2, pages 259-61 (1908). Abstract of article by Willstatter et al.